Nov. 8, 1955  J. M. HOFF  2,723,001
RECOVERY OF ENRICHED GASEOUS MIXTURES
Filed Aug. 8, 1951
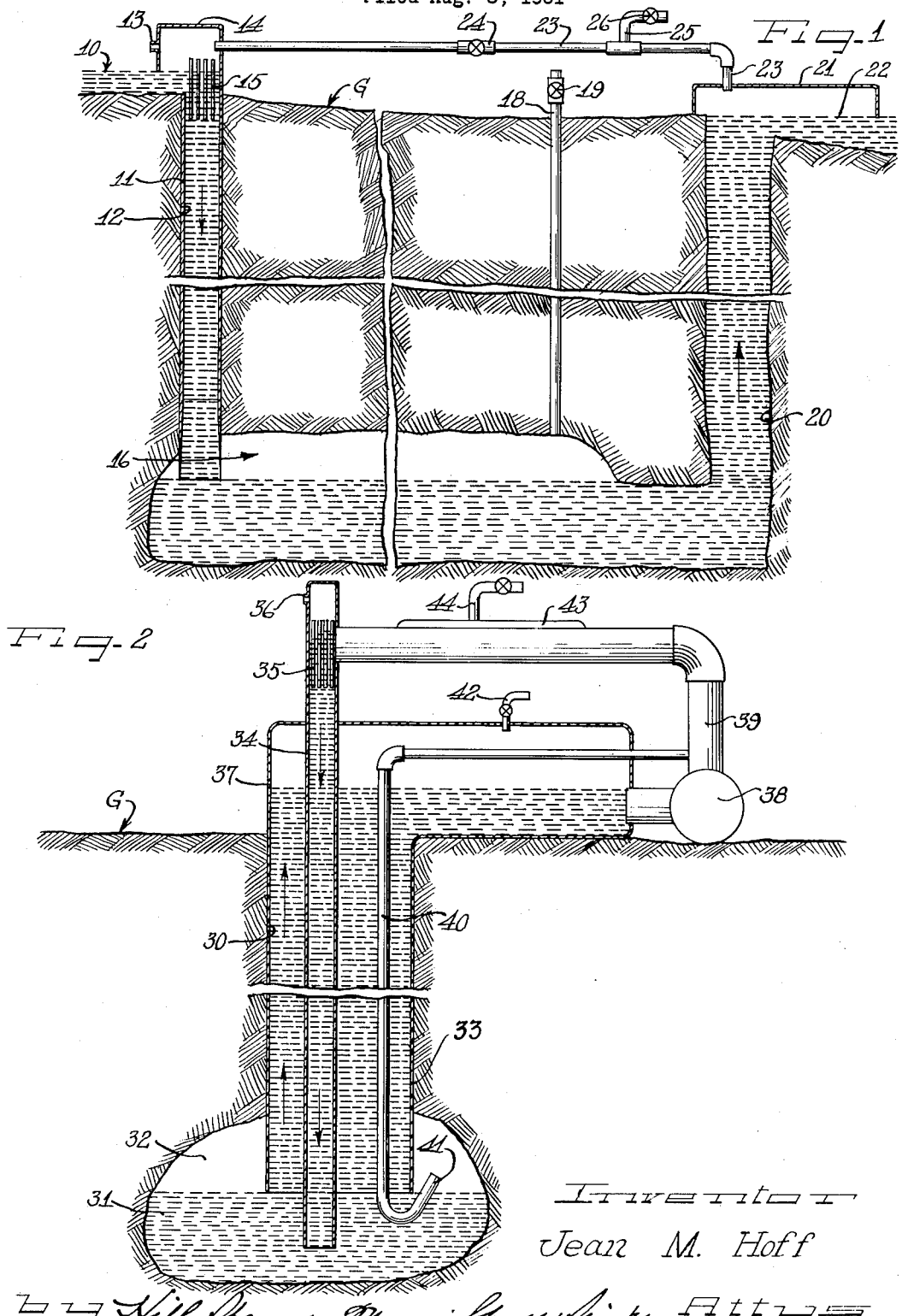
Inventor
Jean M. Hoff

United States Patent Office 2,723,001
Patented Nov. 8, 1955

2,723,001

RECOVERY OF ENRICHED GASEOUS MIXTURES

Jean M. Hoff, Evanston, Ill.

Application August 8, 1951, Serial No. 240,857

8 Claims. (Cl. 183—115)

The present invention relates to an economical means for recovering quantities of oxygen-enriched air.

There is a definite need commercially for a system through which oxygen-enriched air can be produced economically. A relatively cheap source of oxygen-enriched air would substantially reduce the cost of smelting processes in metallurgy, and provide a convenient feed source for oxygen recovery plants producing high purity oxygen.

The present invention is concerned with a modification of the Taylor hydraulic compressor used in some mining installations for the production of compressed air. In a system using a Taylor compressor, the compression of the air is effected by drawing air into a stream of falling water and passing the water-air stream into a separating zone located at a considerable vertical distance below the point of introduction of the water. In the separating zone, the air is liberated at a pressure depending upon the effective hydrostatic head in the separating chamber. The compressed air is then recovered from the separating chamber, while the water is directed from the separating chamber to a tail race at a substantially lower level than the height at which the water is originally introduced.

In the present system, means are provided for recovering the oxygen-enriched air carried by the water leaving the separating chamber. Since oxygen is considerably more soluble in water than is introgen, the compressed air recovered by means of a Taylor compressor is lean with respect to oxygen, while the air remaining with the water leaving the separating chamber is considerably oxygen-enriched. For example, at 20° centigrade, 1000 cc. of water will contain 18.68 cc. of air. This air contains about 34.03 percent oxygen as compared to the normal oxygen content of 21 percent in ordinary air.

The oxygen-enriched air thus recovered can be used for a variety of purposes. One of the more important uses to which the oxygen-enriched air can be put is as a feed material for conventional oxygen plants, thereby reducing the operational costs of such plants. The oxygen-enriched air can also be used for smelting operations or it can be recycled through the compressor to improve the quality of the compressed air recovered, making it more suitable for mine ventilation purposes.

In addition, more than one unit of this type can be operated in series to produce oxygen of relatively high purity. In regions of abundant water power, such operation will provide a cheap source of oxygen.

While the present invention is particularly concerned with a system for the recovery of oxygen from air, the principles embodied in the invention will have equal applicability to the enrichment of other gaseous mixtures whose components have varying degrees of solubility in a given solvent. For example, the process of the present invention may be employed for the separation of methane from nitrogen, methane being about four times more soluble in water than nitrogen. Furthermore, solvents other than water can be employed, as for example, in the separation of hydrocarbon gases from a hydrocarbon oil.

An object of the present invention is to provide a system for the recovery of gases in liquid compressor systems.

Another object of the present invention is to provide a process for recovering a gaseous mixture from a solvent containing dissolved therein quantities of gases having different degrees of solubility in that solvent.

Another object of the present invention is to provide a process for improving the quality of compressed air recovered in a system employing a hydraulic compressor.

Another object of the present invention is to provide an apparatus including a hydraulic compressor unit and containing means for the recovery of oxygen-enriched air.

Another object of the present invention is to provide an apparatus for the continuous recovery of oxygen-enriched compressed air.

Other objects and features of the present invention will be apparent to those skilled in the art from the following discussion of the attached sheet of drawings in which:

Figure 1 is a partially schematic view of a Taylor hydraulic compressor installation, modified in accordance with the present invention; and Figure 2 is a modified form of the invention illustrating the system for the recovery of oxygen-enriched air at substantially higher pressures than the system shown in Figure 1.

In the installation shown in Figure 1, a supply of water 10 at an elevation considerably above the ground level G, flows into a cylindrical conduit 11 disposed in a vertical passageway 12 in the earth's surface. As the water falls by gravity through the conduit 11, it entrains a substantial quantity of air. This air is introduced through an air inlet 13 in a housing 14. Disposed within the housing 14 are a plurality of relatively small diameter air tubes 15, which channel the air stream into the falling water stream. The conduit 11 communicates with a subterranean passage 16 which defines an air-water separating chamber of considerable length. The vertical distance between the level of the water 10 and the air-water separating chamber 16 is usually on the order of several hundred feet so that the water in the air-water separating chamber 16 is at a substantial superatmospheric pressure. Consequently, the entrained air liberated in the chamber will be liberated at an equilibrium pressure which is substantially superatmospheric. It will also be appreciated that the compressed air leaving the water in the air-water separating chamber 16 is substantially saturated with moisture and that the oxygen content of the air is depleted below the oxygen content of normal air due to the greater solubility of oxygen as compared to nitrogen in water. The lean compressed air is recovered from the air-water separating chamber 16 by providing a conduit 18 communicating with the air-water separating chamber 16, the conduit 18 being provided with a valve 19 to regulate flow of compressed air out of the system.

Water containing substantial amounts of entrained oxygen-enriched air leaves the air-water separating chamber 16 through a vertical passage 20. At the termination of the flow, the water is at substantially atmospheric pressure. The change from the substantial superatmospheric pressure in the air-water separating chamber 16 to atmospheric pressure causes the liberation of substantial amounts of oxygen-enriched air. This air is isolated and collected by providing a housing 21 over the tail race 22 which, in effect, is a second air-water separating chamber.

Assuming a pressure of between 8 and 9 atmospheres in the air-water separating chamber 16, approximately 160 cc. of air would be dissolved in 1000 cc. of water at this pressure. Upon reaching atmospheric pressure, approximately 140 cc. of enriched air would be given up, and the oxygen concentration in the enriched air will be a maximum of approximately 34 percent, or somewhat lower, since the oxygen dissolved in the water will decrease as the equilibrium pressure increases. The figures given are merely for purposes of example. In practice, the pressures in the separating chamber may be several times those indicated. While at these elevated pressures, the oxygen content of the enriched air may be considerably lower than the figures given, the balancing of economic factors may make operation at such elevated pressures desirable.

In the embodiment of the invention illustrated in Figure 1, the enriched air is recirculated back to the air inlet means by providing a connecting conduit 23 controlled by a valve 24 between the housing 21 and the housing 14. The purpose of this recirculation is to provide an additional source of oxygen into the compressed air being recovered in the system. It is common practice in mining installations to use the exhaust from tools operated by compressed air to supply an additional amount of oxygen for breathing. The recirculation of the air into the system thus effectively raises the oxygen concentration of the compressed air recovered and makes it more suitable for this purpose.

Some of the oxygen is necessarily lost when using this recirculation. In some installations, therefore, it will be more desirable to compress the enriched air mechanically and then blend it with the lean air.

Alternatively, the oxygen enriched air can be collected or pressed to an oxygen recovery unit for the production of commercially pure oxygen by providing a draw-off line 25 and a valve 26 off of the conduit 23.

The amount of oxygen recovered from systems of the type described could be increased if the water is refrigerated prior to its introduction into the air-water separating chamber 16. If the water in the separating chamber has a temperature of 1° C., approximately 28.42 cc. of air are dissolved in the water. Proportionately more oxygen would therefore be recovered from the water upon return to atmospheric pressure.

Another type of enrichment unit which embodies the principles of the present invention is illustrated in Figure 2. This unit is designed particularly for operation at substantially higher pressures than the unit of Figure 1, but it is equally applicable to a wide range of pressures. The unit of Figure 2 also provides heat exchange areas for minimizing differences in temperature between points of compression and expansion. In this embodiment, a well 30 is provided to the desired depth, the actual depth of the well being dependent upon the optimum pressure condition to be achieved for equilibrium. A water supply 31 at the base of the well is in equilibrium with an air chamber 32 above the level of the water. A conduit 33 extends down to the level of the water 31 to provide a means for circulating the water from the level at the base of the well to ground level.

Disposed concentrically with the conduit 33 is a second conduit 34, the latter carrying a plurality of air inlet pipes 35 for introducing air into a downwardly flowing stream of water. Air enters the stream by means of an air inlet means 36 disposed above the level of the air inlet pipes 35. To provide for increased heat transfer, heat transfer fins can be included on the inner and outer surface of the conduit 34.

The assembly illustrated in Figure 2 also includes a housing 37 which defines an air-water separating chamber at substantially atmospheric pressure, or under a partial vacuum. Water is continuously withdrawn from the air-water separating chamber contained in housing 37 and is pumped by means of a pump 38 through a conduit 39 into a gas separation unit 43 having a vent 44 through which the oxygen-lean air may be vented. After venting of the oxygen-lean air, the water passes into the conduit 34.

Also included in the assembly of Figure 2 is a conduit 40 which provides for flow of compressed air. At the lower end 41 of the conduit 40 is a float (not shown) which operates a valve to maintain a constant water level in the separating chamber. The air contained in the air space 32 will, of course, be lean with respect to oxygen. The compressed air is thereby forced under pressure up through the conduit 40 where it communicates with the discharge end of the pump 38. In this embodiment of the invention, the lean compressed air is used to provide an air-lift effect for the water being pumped into the conduit 34, thereby decreasing the duty required of the pump 38.

The housing 37 is also provided with a valve outlet means 42 for venting off the oxygen-enriched air separated in the housing 37 at substantially atmospheric pressure. As indicated in Figure 2, this oxygen-enriched air may be passed directly to an oxygen recovery plant for the recovery of commercially pure oxygen.

It will also be observed within the modification of Figure 2, substantial heat exchange occurs between the downwardly flowing water in the conduit 34 and the upwardly flowing water in the annular space between the conduit 34 and the outer conduit 33. This heat exchange is effective in minimizing differences in temperature between points at compression of the air and points of expansion.

It will be appreciated that several of the units of the type indicated can be operated in series to recover gaseous mixture containing higher proportions of oxygen.

From the foregoing, it will be evident that the systems of the present invention provide a convenient means for recovering substantially oxygen-enriched air. Mining installations which already employ a Taylor hydraulic compressor can be modified in the manner indicated to supply a convenient source of oxygen-enriched air for smelting operations.

It will be understood that modifications and variations may be effected without departing from the scope of the novel concepts of the present invention.

I claim as my invention:

1. In the art of oxygen concentration from air by selective absorption, the improvement which comprises driving a stream of absorbing liquid through a closed liquid circuit, at one point in the circuit directing the stream downwardly past atmospheric air at substantially atmospheric pressure to entrain the air in the liquid stream, continuing the downward flow of the air-entraining liquid stream to develop a substantial hydrostatic pressure therein, then separating out compressed unabsorbed gases from the stream while retaining the stream under substantially the pressure of said hydrostatic pressure, next flowing the liquid stream upwardly to obtain substantially atmospheric pressure therein and to liberate the absorbed oxygen-rich gases from the stream, after liberating the absorbed gases from the stream injecting said compressed unabsorbed gases into said liquid stream to assist in raising said liquid stream to the original level of said one point, and then releasing and removing said injected gases from the stream and recycling the stream back to said one point.

2. In the art of oxygen concentration from air by selective absorption, the improvement which comprises driving a stream of absorbing liquid through a closed liquid circuit, at one point in the circuit directing the stream downwardly past air at substantially atmospheric pressure to entrain the air in the liquid while maintaining the liquid as the external continuous phase, continuing the downward flow of the air-entraining liquid to develop a substantial hydrostatic pressure therein, then separating out and removing compressed unabsorbed gases while retaining the liquid under substantially the pressure of said hydrostatic pressure, next flowing the liquid stream upwardly to obtain substantially atmospheric pressure therein to release absorbed gases and recovering the same, said continuously flowing downward and upward streams being maintained in heat exchange relationship by effecting heat transfer therebetween, after removal of absorbed gases from the stream expanding said compressed unabsorbed gases to do work for driving said stream back to said one point and to cool said stream by removal of heat therefrom.

3. In the art of oxygen concentration from air by selective absorption, the improvement which comprises driving a stream of absorbing liquid through a closed liquid circuit, at one point in the circuit directing the stream downwardly past air at a given pressure to entrain the air in the liquid stream, continuing the downward flow of the air-entraining liquid stream to develop a substantially hydrostatic pressure therein greater than said given pressure, then separating out compressed unabsorbed gases from the stream while retaining the stream under substantially the pressure of said hydrostatic pressure, next flowing the liquid stream upwardly to obtain substantially said given pressure therein and to liberate the absorbed gases from the stream, after liberating the absorbed gases from the stream injecting said compressed unabsorbed gases into said liquid stream to assist in raising said liquid stream to the original level of said one point, and then releasing and removing said injected gases from the stream and recycling the stream back to said one point.

4. In the art of concentrating a constituent gas appearing in a mixture of gases by selective absorption, the improvement which comprises driving a stream of absorbing liquid having a preferential absorbing capacity for said constituent gas relative to the other gases in said mixture through a closed liquid circuit, at one point in the circuit directing the stream downwardly past said mixture at substantially atmospheric pressure to entrain the mixture in the liquid stream, continuing the downward flow of the entraining liquid stream to develop a substantial hydrostatic pressure therein, then separating out compressed unabsorbed gases from the stream while retaining the stream under substantially the pressure of said hydrostatic pressure, next flowing the liquid stream upwardly to obtain substantially atmospheric pressure therein and to liberate the absorbed gases from the stream, after liberating the absorbed gases from the stream injecting said compressed unabsorbed gases into said liquid stream to assist in raising said liquid stream to the original level of said one point, and then releasing and removing said injected gases from the stream and recycling the stream back to said one point.

5. In the art of concentrating a constituent gas appearing in a mixture of gases by selective absorption, the improvement which comprises driving a stream of absorbing liquid having a preferential absorbing capacity for said constituent gas relative to the other gases in said mixture through a closed liquid circuit, at one point in the circuit directing the stream downwardly past said mixture at a given pressure to entrain the mixture in the liquid stream, continuing the downward flow of the entraining liquid stream to develop a substantial hydrostatic pressure therein greater than said given pressure, then separating out compressed unabsorbed gases from the stream while retaining the stream under substantially the pressure of said hydrostatic pressure, next flowing the liquid stream upwardly to obtain substantially said given pressure therein and to liberate the absorbed gases from the stream, after liberating the absorbed gases from the stream injecting said compressed unabsorbed gases into said liquid stream to assist in raising said liquid stream to the original level of said one point, and then releasing and removing said injected gases from the stream and recycling the stream back to said one point.

6. In the art of oxygen concentration from air by selective absorption, the improvement which comprises driving a stream of absorbing liquid through a closed liquid circuit, at one point in the circuit directing the stream downwardly past air at a given pressure to entrain the air in the liquid while maintaining the liquid as the external continuous phase, continuing the downward flow of the entraining liquid to develop a substantial hydrostatic pressure therein greater than said given pressure, then separating out and removing compressed unabsorbed gases while retaining the liquid under substantially the pressure of said hydrostatic pressure, next flowing the liquid stream upwardly to obtain substantially said given pressure therein to release absorbed gases and recovering the same, said continuously flowing downward and upward streams being maintained in heat exchange relationship by effecting heat transfer therebetween, and after removal of absorbed gases from the stream expanding said compressed unabsorbed gases to do work for pumping said liquid through said circuit.

7. In the art of concentrating a constituent gas appearing in a mixture of gases by selective absorption, the improvement which comprises driving a stream of absorbing liquid having a preferential absorbing capacity for said constituent gas relative to the other gases in said mixture through a closed liquid circuit, at one point in the circuit directing the stream downwardly past the mixture at substantially atmospheric pressure to entrain the mixture in the liquid while maintaining the liquid as the external continuous phase, continuing the downward flow of the entraining liquid to develop a substantial hydrostatic pressure therein, then separating out and removing compressed unabsorbed gases while retaining the liquid under substantially the pressure of said hydrostatic pressure, next flowing the liquid stream upwardly to obtain substantially atmospheric pressure therein to release absorbed gases and recovering the same, said continuously flowing downward and upward streams being maintained in heat exchange relationship by effecting heat transfer therebetween, and after removal of absorbed gases from the stream expanding said compressed unabsorbed gases to do work for pumping said liquid through said circuit.

8. In the art of concentrating a constituent gas appearing in a mixture of gases by selective absorption, the improvement which comprises driving a stream of absorbing liquid having a preferential absorbing capacity for said constituent gas relative to the other gases in said mixture through a closed liquid circuit, at one point in the circuit directing the stream downwardly past the mixture at a given pressure to entrain the mixture in the liquid while maintaining the liquid as the external continuous phase, continuing the downward flow of the entraining liquid to develop a substantial hydrostatic pressure therein greater than said given pressure, then separating out and removing compressed unabsorbed gases while retaining the liquid under substantially the pressure of said hydrostatic pressure, next flowing the liquid stream upwardly to obtain substantially said given pressure therein to release absorbed gases and recovering the same, said continuously flowing downward and upward streams being maintained in heat exchange relationship by effecting heat transfer therebetween, and after removal of absorbed gases from the stream expanding said compressed unabsorbed gases to do work and to do work for pumping said liquid through said circuit.

References Cited in the file of this patent

UNITED STATES PATENTS

| 562,052 | Waring, Jr. | June 16, 1896 |
| 704,059 | Linton | July 8, 1902 |
| 739,472 | Bachman | Sept. 22, 1903 |
| 900,814 | Wilson | Oct. 12, 1908 |
| 2,086,778 | Peffer et al. | July 13, 1937 |